(12) United States Patent
Pack et al.

(10) Patent No.: US 11,120,783 B2
(45) Date of Patent: Sep. 14, 2021

(54) COMPOSITE ARTICLE FOR MITIGATING NOISE, VIBRATION, AND HARSHNESS

(71) Applicant: GM Global Technology Operations LLC, Detroit, MI (US)

(72) Inventors: Seongchan Pack, West Bloomfield, MI (US); Su Jung Han, West Bloomfield, MI (US); Martin S. Kramer, Davisburg, MI (US)

(73) Assignee: GM Global Technology Operations LLC, Detroit, MI (US)

(*) Notice: Subject to any disclaimer, the term of this patent is extended or adjusted under 35 U.S.C. 154(b) by 557 days.

(21) Appl. No.: 16/124,926

(22) Filed: Sep. 7, 2018

(65) Prior Publication Data

US 2020/0082803 A1 Mar. 12, 2020

(51) Int. Cl.
| | |
|---|---|
| *G10K 11/168* | (2006.01) |
| *B32B 5/02* | (2006.01) |
| *B32B 15/14* | (2006.01) |
| *B32B 3/30* | (2006.01) |
| *B32B 3/12* | (2006.01) |

(52) U.S. Cl.
CPC ............ *G10K 11/168* (2013.01); *B32B 3/12* (2013.01); *B32B 3/30* (2013.01); *B32B 5/024* (2013.01); *B32B 15/14* (2013.01); *B32B 2264/105* (2013.01); *B32B 2307/102* (2013.01); *B32B 2605/08* (2013.01)

(58) Field of Classification Search
CPC ... B32B 5/024; B32B 15/14; B32B 2264/105; B32B 2307/102; B32B 2605/08; B32B 3/12; B32B 3/30; G10K 11/168

USPC .......................................................... 181/286
See application file for complete search history.

(56) References Cited

U.S. PATENT DOCUMENTS

| | | | | |
|---|---|---|---|---|
| 4,463,049 A | * | 7/1984 | Kracke | E04B 1/86 |
| | | | | 181/198 |
| 6,345,688 B1 | * | 2/2002 | Veen | G10K 11/162 |
| | | | | 181/290 |
| 6,821,607 B2 | * | 11/2004 | Zwick | B32B 3/28 |
| | | | | 181/290 |
| 9,508,334 B1 | * | 11/2016 | D'Antonio | E04B 1/84 |
| 10,336,433 B2 | * | 7/2019 | Stache | G10K 11/168 |
| 2004/0069564 A1 | * | 4/2004 | Wang | G10K 11/168 |
| | | | | 181/293 |
| 2008/0302599 A1 | * | 12/2008 | Zou | G10K 11/168 |
| | | | | 181/290 |

(Continued)

*Primary Examiner* — Forrest M Phillips
(74) *Attorney, Agent, or Firm* — Quinn IP Law

(57) ABSTRACT

A composite article configured for mitigating noise, vibration, and harshness includes a substrate having a first stiffness. The composite article includes a structural film formed from a composition and disposed on the substrate in a pattern that is arranged to dampen a sound wave having a first frequency and a first amplitude and propagatable in a first direction to a second frequency that is less than the first frequency and a second amplitude that is less than the first amplitude. The composite article includes a coating layer disposed on the pattern and configured to dampen the sound wave in the first direction and in a second direction that is perpendicular to the first direction. The composite article has a second stiffness that is greater than the first stiffness. A method of forming the composite article is also described.

20 Claims, 3 Drawing Sheets

(56) References Cited

U.S. PATENT DOCUMENTS

| | | | |
|---|---|---|---|
| 2010/0032234 A1* | 2/2010 | Niwa | B60R 13/0838 181/290 |
| 2010/0108438 A1* | 5/2010 | Duffy | B32B 13/02 181/290 |
| 2011/0100748 A1* | 5/2011 | Nonogi | B32B 23/10 181/291 |
| 2011/0139542 A1* | 6/2011 | Borroni | B60R 13/0861 181/290 |
| 2012/0175185 A1* | 7/2012 | Rousseau | B60R 13/0212 181/290 |
| 2015/0183383 A1* | 7/2015 | Park | B32B 7/06 181/290 |
| 2015/0184374 A1* | 7/2015 | Kang | G10K 11/172 181/290 |
| 2016/0083960 A1* | 3/2016 | Gleeson | B32B 13/047 52/483.1 |
| 2016/0201318 A1* | 7/2016 | Israel | G10K 11/168 181/290 |

* cited by examiner

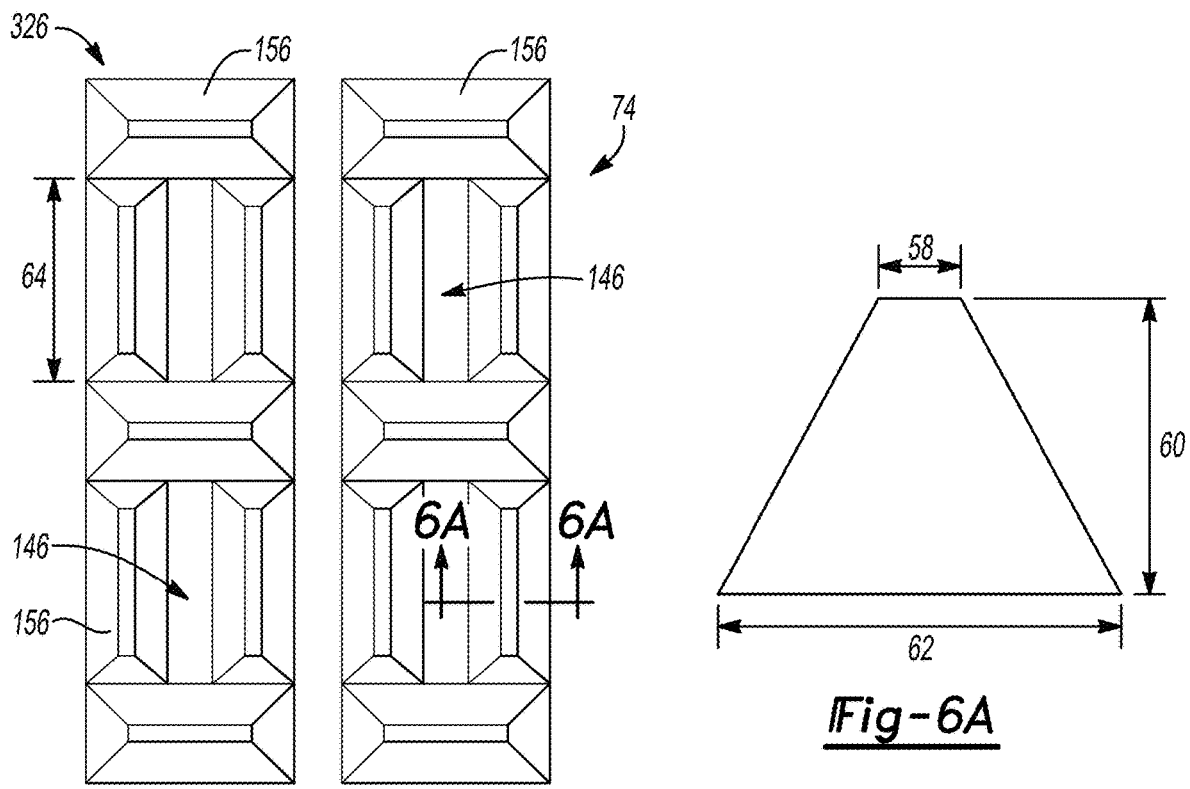
*Fig-6*
*Fig-6A*
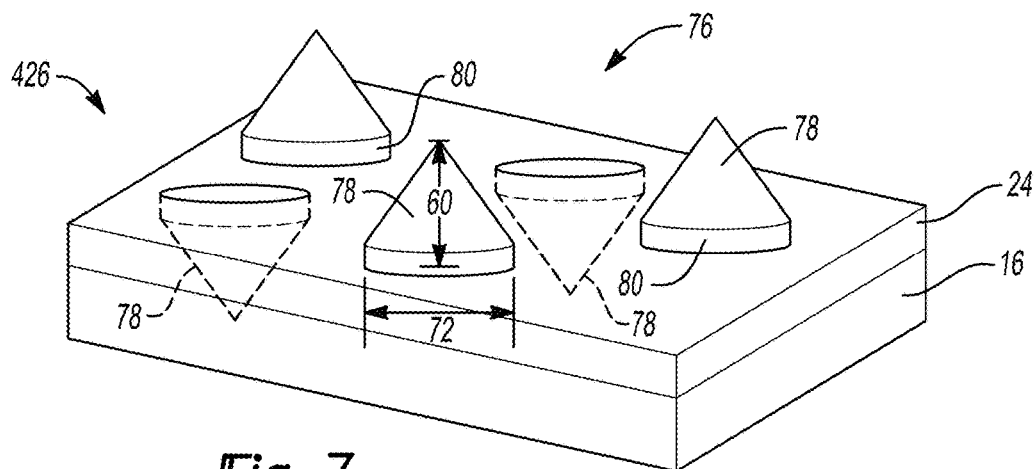
*Fig-7*
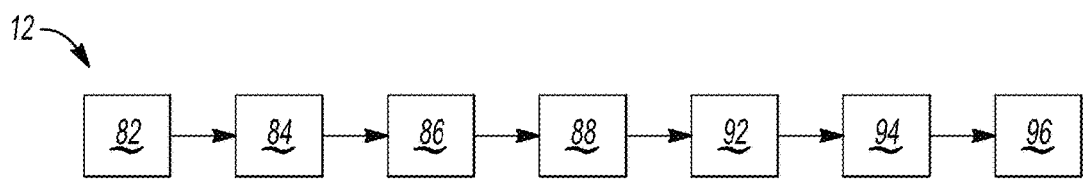
*Fig-8*

COMPOSITE ARTICLE FOR MITIGATING NOISE, VIBRATION, AND HARSHNESS

INTRODUCTION

The disclosure relates to a composite article configured for mitigating noise, vibration, and harshness and to a method of forming the composite article.

Devices and components often emit noise and vibration during operation, and such noise and vibration may be measured in terms of harshness as experienced by an operator or user. For example, an engineering gear or a ball bearing cage may produce noise in the form of an unwanted sound, vibration as a result of oscillations that are generally felt rather than heard, and/or harshness, i.e., a severity or discomfort associated with the noise or vibration. Over time, such noise, vibration, and harshness may spoil an operating environment and contribute to user fatigue or discomfort.

SUMMARY

A composite article configured for mitigating noise, vibration, and harshness includes a substrate having a first stiffness. The composite article also includes a structural film formed from a composition and disposed on the substrate in a pattern that is arranged to dampen a sound wave having a first frequency and a first amplitude and propagatable in a first direction to a second frequency that is less than the first frequency and a second amplitude that is less than the first amplitude. The composite article further includes a coating layer disposed on the pattern and configured to dampen the sound wave in the first direction and in a second direction that is perpendicular to the first direction. The composite article has a second stiffness that is greater than the first stiffness.

The structural film may contact the substrate at a contact interface, and the composition and the contact interface may define a contact angle of from 0° to 90°. Further, the substrate may have a first surface and a second surface spaced opposite the first surface, and the structural film may be solely disposed on the first surface.

In one aspect, the substrate may be a metal and the composition may be a polymer. In another aspect, the substrate may be a polymer and the composition may be a metal. The coating layer may include a metallic composite particulate deposited within a plurality of woven layers without breaking the plurality of woven layers.

In an additional aspect, the structural film may have an artificial mean roughness, Ra, of from 4 microns to 15 microns; a ten-point mean roughness, Rz, of from 35 microns to 110 microns; a reduced peak height, Rpk, of from 2.5 microns to 15 microns; a core roughness, Rk, of from 13 microns to 45 microns; and a reduced valley depth, Rvk, of from 2.5 microns to 15 microns.

In one aspect, the pattern may be configured as a sponge such that the structural film defines a plurality of voids therein. In another aspect, the pattern may be configured as a plurality of ribbons.

In a further aspect, the pattern may be configured as a honeycomb including a plurality of diamonds and a plurality of hexagons each adjoining at least two of the plurality of diamonds and at least another one of the plurality of hexagons. Each side of the plurality of hexagons may protrude from the substrate as a wedge having a top width of from 20 microns to 50 microns, a height of from 150 microns to 170 microns, and a base width of from 40 microns to 80 microns. Further, each side of the plurality of diamonds may have a height of from 50 microns to 70 microns and a width of from 20 microns to 30 microns. The pattern may further include a plurality of retainers each configured to stabilize the honeycomb such that one of the plurality of retainers is disposed within a respective cavity defined by each of the plurality of hexagons and protrudes from the substrate. Each of the plurality of retainers may have a width of from 100 microns to 120 microns and a height of from 20 microns to 30 microns.

In another aspect, the pattern may be configured as a wedge field and may include a plurality of adjoining wedges each having a top width of from 40 microns to 60 microns, a height of from 100 microns to 120 microns, a base width of from 80 microns to 120 microns, and a length of from 400 microns to 600 microns. Four of the plurality of adjoining wedges may form a rectangle defining a void therebetween.

In an additional aspect, the pattern may be configured as an embossed field and may include a plurality of cones extending from the substrate. Each of the plurality of cones may have a circular base having a diameter of from 50 microns to 80 microns and a height of from 100 microns to 120 microns.

A method of forming a composite article configured for mitigating noise, vibration, and harshness includes depositing a composition onto a substrate having a first stiffness. The method further includes curing the composition to form a structural film disposed on the substrate in a pattern that is arranged to dampen a sound wave having a first frequency and a first amplitude and propagatable in a first direction to a second frequency that is less than the first frequency and a second amplitude that is less than the first amplitude. The method also includes quantifying a roughness profile of the pattern, and measuring the second frequency and the second amplitude. The method also includes coating the pattern with a coating layer configured to dampen the sound wave in the first direction and in a second direction that is perpendicular to the first direction. The composite article has a second stiffness that is greater than the first stiffness.

The method may further include, after depositing, subtracting a portion of the structural film. The method may also include minimizing an interfacial energy between the substrate and the structural film.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 6 is a schematic illustration of a top view of a fourth embodiment of the pattern of FIGS. 1 and 2 configured as a wedge field.

FIG. 6A is a schematic illustration of a cross-sectional view of a portion of the pattern of FIG. 6 taken along section lines 6A-6A.

FIG. 7 is a schematic illustration of a perspective view of a fifth embodiment of the pattern of FIGS. 1 and 2.

FIG. 8 is a schematic flowchart of a method of forming the composite article of FIGS. 1-8.

DETAILED DESCRIPTION

Figure 1:
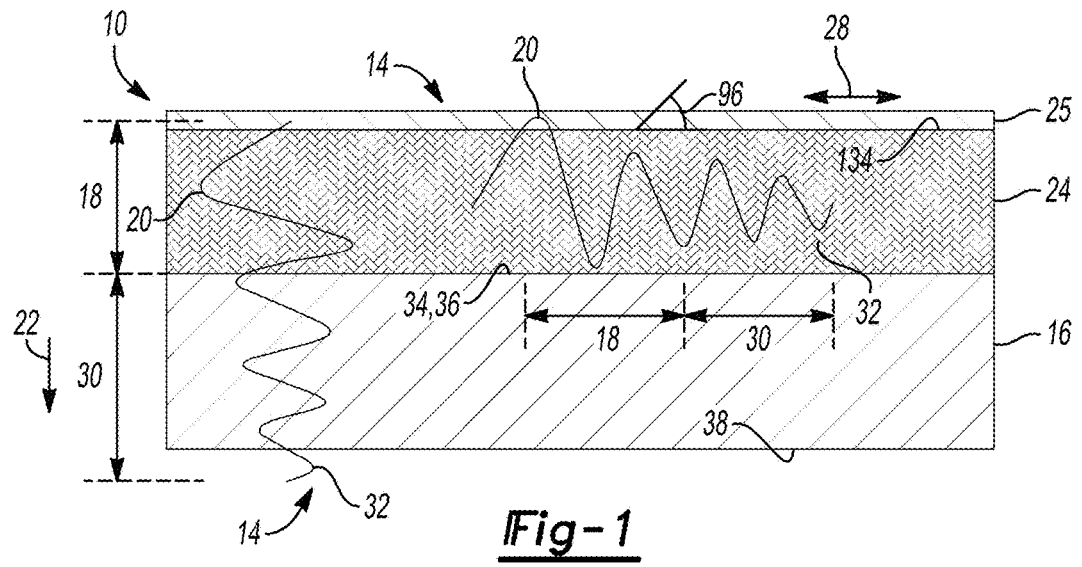
FIG. 1 is a schematic illustration of a cross-sectional view of a composite article including a structural film disposed on a substrate in a pattern that is arranged to dampen a sound wave and enhance an interfacial strength.

Referring to the Figures, wherein like reference numerals refer to like elements, a composite article 10 configured for mitigating noise, vibration, and harshness and a method 12 of forming the composite article 10 are shown generally in FIGS. 1 and 8, respectively. The composite article 10 and method 12 may be useful for applications requiring excellent operating efficiency and minimal noise, vibration, and harshness during operation. As used herein, the terminology noise refers to an unwanted sound; the terminology vibration refers to an oscillation that is generally felt rather than heard; and the terminology harshness refers to a severity or discomfort associated with the noise or vibration, especially for comparatively short-duration events. In particular, the composite article 10 may dampen a sound wave 14 (FIG. 1) during operation so as to mitigate noise, vibration, and harshness, yet may have excellent stiffness and mechanical properties. That is, the composite article 10 may efficiently and effectively dissipate sound energy, but may also be suitable for applications requiring excellent stiffness, strength, and toughness. Further, the composite article 10 may be economical to manufacture, may be scalable to mass production manufacturing operations, and may improve an operating environment.

As such, the composite article 10 and method 12 may be useful for vehicular applications such as, but not limited to, automobiles, buses, forklifts, motorcycles, bicycles, trains, trams, trolleys, spacecraft, airplanes, farming equipment, earthmoving or construction equipment, cranes, tanks and transporters, boats, and the like. For example, the composite article 10 and method 12 may be useful for electric traction motor applications, gears, bearing cages, engine bore liners, and the like for non-autonomous, autonomous, or semi-autonomous vehicle applications. Alternatively, the composite article 10 and method 12 may be useful for non-vehicular applications such as stationary power generation, residential appliances, portable power generation, electronics, computers, tools, and the like.

More specifically, as described with reference to FIG. 1, the composite article 10 includes a substrate 16 having a first stiffness. In one embodiment, the substrate 16 may be formed from a polymer. Alternatively, the substrate 16 may be formed from a metal. By way of non-limiting examples, the substrate 16 may be a gear or a ball bearing cage and may, if left untreated, transmit therethrough or amplify a sound wave 14 (FIG. 1).

However, to mitigate the sound wave 14 as set forth in more detail below, the composite article 10 also includes a structural film 24 formed from a composition and disposed on the substrate 16 in a pattern 26, 126, 226, 326, 426 (FIGS. 3-7) that is arranged to dampen the sound wave 14. More specifically, the sounds wave 14 has a first frequency 18 and a first amplitude 20 and is propagatable in a first direction 22. The pattern 26, 126, 226, 326, 426 is arranged to dampen the sound wave 14 to a second frequency 30 that is less than the first frequency 18 and a second amplitude 32 that is less than the first amplitude 20. As set forth in more detail below, the structural film 24 may be structurally built or manufactured or formed.

In addition, as described with continued reference to FIG. 1, the composite article 10 also includes a coating layer 25 disposed on the pattern 26, 126, 226, 326, 426 and configured to dampen the sound wave 14 in the first direction 22 and a second direction 28 that is perpendicular to the first direction 22. That is, the coating layer 25 may coat or cover the pattern 26, 126, 226, 326, 426 and contribute to dampening the sound wave 14 and increase the first stiffness of the composite article 10. The coating layer 25 may be formed from, for example, a metallic composite particulate 40, polymer- or fiber-filled cored wire, aluminum, selenium, zinc, copper steel alloy, and combinations thereof and may increase the first stiffness and strength of the substrate 16 as set forth in more detail below. In one non-limiting example, the coating layer 25 may be multilayered and include layers formed from the same or different materials. Therefore, in combination, the coating layer 25 and the structural film 24 may dampen the sound wave 14 to the second frequency 30 and the second amplitude 32 and may increase the first stiffness of the composite article 10.

Figure 2:
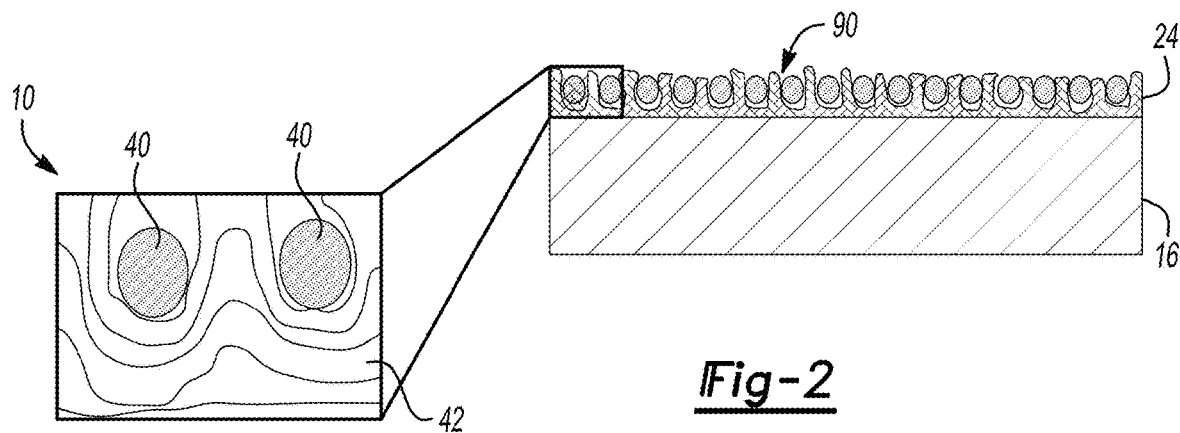
FIG. 2 is a schematic illustration of a cross-sectional and exploded view of another embodiment of the composite article of FIG. 1.

Further, referring now to FIG. 2 and as set forth in more detail below with respect to the method 12 of forming the composite article 10, the coating layer 25 may be formed from at least one of a metallic or metallic composite particulate 40 and particulated foam of a metallic wire or a polymer/fiber-filled cored metal wire. For example, the coating layer 25 may include or be combined with the metallic composite particulate 40 deposited within a plurality of woven layers 42 without breaking the plurality of woven layers 42. That is, the coating layer 25 may include a maintained woven layer structure. It is to be appreciated that FIG. 2 illustrates an initial layer of the coating layer 25. That is, additional layers may be deposited onto the initial layer, for example, via various spraying processes to form the coating layer 25, as set forth in more detail below.

The composite article 10 has a second stiffness that is greater than the first stiffness. That is, the structural film 24 and coating layer 25 may enhance the sound dampening capabilities of the substrate 16 and may increase the stiffness of the substrate 16 such that the composite article 10 may have excellent noise, vibration, and harshness dampening and suitable stiffness for comparatively high-torque operating conditions, as set forth in more detail below.

As described with continued reference to FIG. 1, the structural film 24 may contact the substrate 16 at a contact interface 34, and the structural film 24 may have excellent adhesion to the substrate 16 at the contact interface 34. The contact interface 34 may correspond to a boundary between two different materials, i.e., the composition and the substrate 16. More specifically, the composition and the contact interface 34 may define a contact angle 96 of from 0° to 90° such that the composition may have excellent wettability and adhesion to the substrate 16.

In addition, the coating layer 25 may contact the structural film 24 at a second contact interface 134 (FIG. 1), and the coating layer 25 may have excellent adhesion to the structural film 24 at the second contact interface 134. The second contact interface 134 may correspond to a boundary between the structural film 24, e.g., the pattern 26, 126, 226, 326, 426, and the coating layer 35. More specifically, the coating layer 25 and the second contact interface 134 may define the contact angle 96 of from 0° to 90° such that the coating layer 25 may have excellent wettability and adhesion to the structural film 24. In particular, the pattern 26, 126, 226, 326, 426 may increase a surface area onto which the coating layer 25 may be deposited.

Further, the substrate 16 may have a first surface 36 and a second surface 38 spaced opposite the first surface 36, and the structural film 24 may be disposed solely on the first surface 36, as illustrated in FIG. 1. Alternatively, although not shown, the structural film 24 may be disposed on both the first surface 36 and the second surface 38 so as to encapsulate the substrate 16.

In one aspect, the composition for forming the structural film 24 may be a polymer. That is, the substrate 16 may be a metal and the composition may be a polymer. In another aspect, the composition may be a metal. That is, the substrate 16 may be a polymer and the composition may be a metal.

Figure 3:
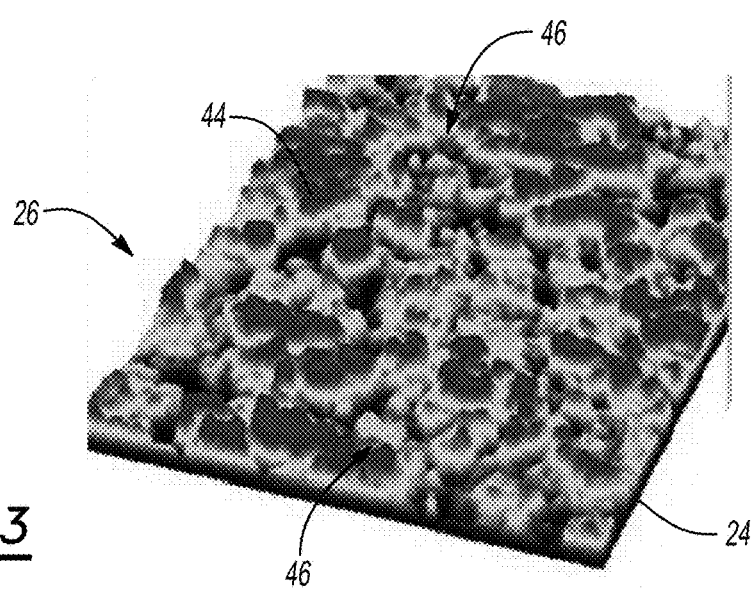
FIG. 3 is a schematic illustration of a perspective view of one embodiment of the pattern of FIGS. 1 and 2 configured as a sponge.

As set forth above, the structural film 24 is disposed on the substrate 16 in a pattern 26, 126, 226, 326, 426 that is arranged to dampen the sound wave 14 and thereby mitigate noise, vibration, and harshness. Referring now to FIG. 3, in one embodiment, the pattern 26 may be configured as a sponge 44 such that the structural film 24 defines a plurality of voids 46 therein. That is, the pattern 26 may include a random dispersion of the plurality of voids 46 along the substrate 16 (FIG. 1) such that the structural film 24 includes a plurality of peaks and defines a corresponding plurality of valleys therein. The pattern 26 configured as the sponge 44 may effectively disrupt and dissipate the sound wave 14 (FIG. 1) as the sound wave 14 propagates across the plurality of voids 46.

In another embodiment described with reference to FIG. 4, the pattern 126 may be configured as a plurality of ribbons 48. That is, the structural film 24 may include a number of ribbons 48 that undulate along the substrate 16. Such undulation may also effectively disrupt and dissipate the sound wave 14 as the sound wave 14 propagates across the plurality of ribbons 48.

More specifically, for the patterns 26, 126 configured as the sponge 44 and the plurality of ribbons 48, the structural film 24 may have a surface roughness characterized by an arithmetical mean roughness, Ra; a ten-point mean roughness, Rz; a reduced peak height, Rpk; a core roughness, Rk; and a reduced valley depth, Rvk. As used herein, the term arithmetical mean roughness refers to an average of an absolute value of a height of the structural film 24 with respect to the substrate 16 along a sampling length. The term ten-point mean roughness, Rz, refers to an absolute vertical distance between a maximum profile peak height and a maximum profile valley depth along the sampling length. The term reduced peak height, Rpk, refers to an average height of the plurality of peaks protruding above the core roughness, Rk. The term reduced valley depth, Rvk, refers to an average depth of the plurality of valleys extending below the core roughness, Rk. The term core roughness, Rk, refers to a measurement derived from a bearing ratio curve based on the ISO 13565-2:1996 standard. For each roughness profile, the bearing area curve may be generated by simulating a horizontal line moving through the profile from a top down to evaluate a percentage of contact the horizontal line would make with a surface of the structural film 24 at each level. Therefore, the core roughness, Rk, refers to a measurement of the peak-to-valley roughness of the structural film 24 with a maximum peak height and minimum valley depth removed.

Figure 4:
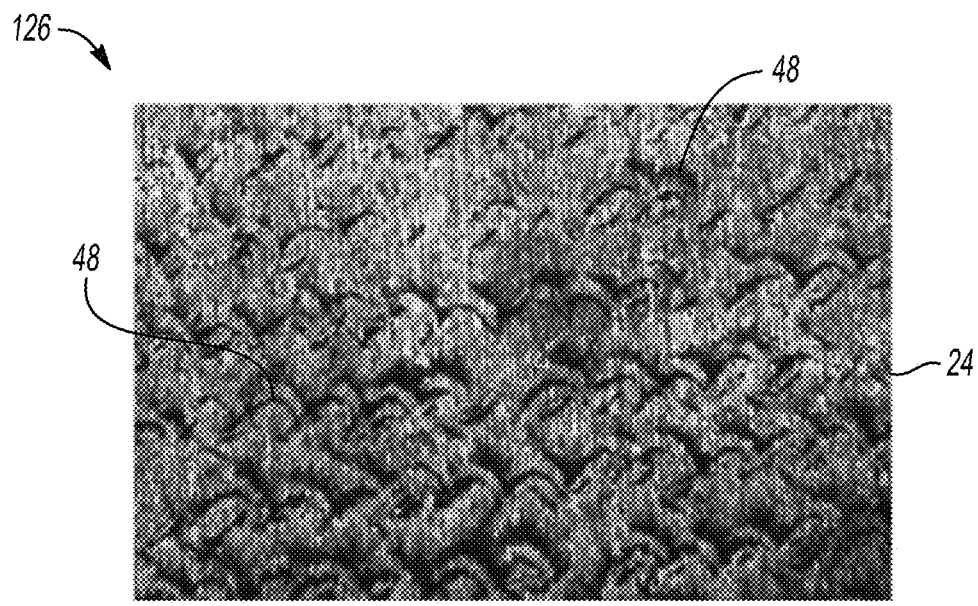
FIG. 4 is a schematic illustration of a perspective view of a second embodiment of the pattern of FIGS. 1 and 2 configured as a plurality of ribbons.

In particular, for the embodiments illustrated in FIGS. 3 and 4, the structural film 24 may have an arithmetical mean roughness, Ra, of from 4 microns to 15 microns, e.g., from 7 microns to 12 microns, wherein 1 micron is equal to $1\times10^{-6}$ m. The structural film 24 may have a ten-point mean roughness, Rz, of from 35 microns to 110 microns, e.g., from 50 microns to 100 microns. Further, the structural film 24 may have a reduced peak height, Rpk, of from 2.5 microns to 15 microns, e.g., from 5 microns to 12 microns. In addition, the structural film 24 may have a core roughness, Rk, of from 13 microns to 45 microns, e.g., from 20 microns to 40 microns. The structural film 24 may also have a reduced valley depth, Rvk, of from 2.5 microns to 15 microns, e.g., from 5 microns to 12 microns. At values above or below the aforementioned ranges, the structural film 24 may not sufficiently dissipate the sound wave 14 and/or may not sufficiently enhance the stiffness, strength, and/or toughness of the substrate 16. That is, the structural film 24 having the aforementioned characteristics and values may dampen the sound wave 14 in the first direction 22 (FIG. 1) and the second direction 28 (FIG. 1) to the second frequency 30 and the second amplitude 32 so as to provide the composite article 10 with excellent second stiffness, increased strength as compared to the first strength of the substrate 16, and effective dissipation of noise, vibration, and harshness.

Figures 5, 5A:
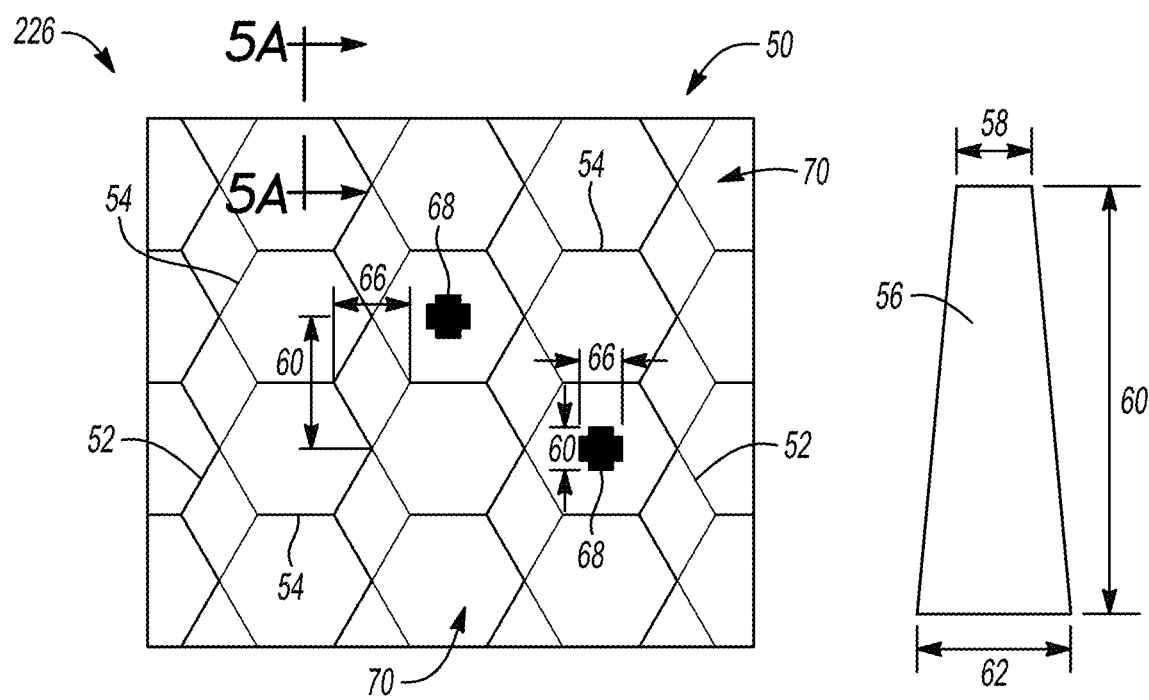
FIG. 5 is a schematic illustration of a top view of a third embodiment of the pattern of FIGS. 1 and 2 configured as a honeycomb.
FIG. 5A is a schematic illustration of a cross-sectional view of a portion of the pattern of FIG. 5 taken along section lines 5A-5A.

Referring now to FIGS. 5 and 5A, in another embodiment, the pattern 226 may be configured as a honeycomb 50. The honeycomb 50 may include a plurality of diamonds 52 and a plurality of hexagons 54. Each of the plurality of hexagons 54 may adjoin at least two of the plurality of diamonds 52 and at least another one of the plurality of hexagons 54 to form the honeycomb 50 illustrated in FIG. 5. Referring to FIG. 5A, each side of the plurality of hexagons 54 may protrude from the substrate 16 as a wedge 56 having a top width 58 of from 20 microns to 50 microns, e.g., from 30 microns to 40 microns; a height 60 of from 150 microns to 170 microns, e.g., from 155 microns to 165 microns; and a base width 62 of from 40 microns to 80 microns, e.g., from 55 microns to 65 microns. Further, as shown in FIG. 5, each of the plurality of diamonds 52 may have a height 60 of from 50 microns to 70 microns, e.g., from 55 microns to 65 microns, and a width 66 of from 20 microns to 30 microns, e.g., from 22 microns to 28 microns.

In another aspect described with continued reference to FIG. 5, the pattern 226 may further include a plurality of retainers 68 each configured to stabilize the honeycomb 50 such that one of the plurality of retainers 68 is disposed within a respective cavity 70 defined by each of the plurality of hexagons 54 and protrudes from the substrate 16. That is, the plurality of retainers 68 may prevent or minimize collapse of the honeycomb 50 and provide extra interference as the sound wave 14 propagates through the structural film 24. Each of the plurality of retainers 68 may have a width 66 of from 100 microns to 120 microns, e.g., from 105 microns to 115 microns, and a height 60 of from 20 microns to 30 microns, e.g., from 23 microns to 27 microns.

Referring now to FIGS. 6 and 6A, in a further embodiment, the pattern 326 may be configured as a wedge field 74 and may include a plurality of adjoining wedges 156. As best shown in FIG. 6A, each of the plurality of adjoining wedges 156 may have a top width 58 of from 40 microns to 60 microns, e.g., from 45 microns to 55 microns; a height 60 of from 100 microns to 120 microns, e.g., from 105 microns to 115 microns; a base width 62 of from 80 microns to 120 microns, e.g., from 90 microns to 110 microns; and a length 64 of from 400 microns to 600 microns, e.g., 450 microns to 550 microns. More specifically, as shown in FIG. 6, four of the plurality of adjoining wedges 156 may form a rectangle defining a void 146 therebetween.

Referring now to FIG. 7, the pattern 426 may be configured as an embossed field 78 and may include a plurality of cones 76 extending from the substrate 16. Alternatively or additionally, as also illustrated in FIG. 7, the embossed field 78 may define one or more cones 76 extending towards the substrate 16. In particular, each of the plurality of cones 76 may have a circular base 80 having a diameter 72 of from 50 microns to 80 microns, e.g., from 60 microns to 70 microns, and a height 60 of from 100 microns to 120 microns, e.g., from 105 microns to 115 microns.

For each of the embodiments and configurations of the pattern 26, 126, 226, 326, 426 set forth above, at values above or below the aforementioned ranges, the structural film 24 may not sufficiently dissipate the sound wave 14 and/or may not sufficiently enhance the stiffness, strength, and/or toughness of the substrate 16. That is, the structural film 24 having the aforementioned characteristics and values and the coating layer 25 may dampen the sound wave 14 in the first direction 22 and the second direction 28 to the second frequency 30 and the second amplitude 32 so as to provide the composite article 10 with excellent second stiffness, increase strength as compared to the first strength of the substrate 16, and effective dissipation of noise, vibration, and harshness.

Referring now to FIG. 8, the method 12 of forming the composite article 10 includes depositing 82 the composition onto the substrate 16. In one embodiment, depositing 82 may include additively disposing the composition onto the substrate 16 layer-by-layer. For example, depositing 82 may include stacking the composition including at least one of uniaxial, biaxial, and triaxial woven fabrics in different sequences onto the substrate 16. Alternatively, depositing 82 may include placing the composition including a non-crimp fabric onto the substrate 16. Additionally or alternatively, depositing 82 may include sequentially adding a polymer to the substrate 16 via additive manufacturing or 3D printing. Alternatively, depositing 82 may include sequentially building up the structural film 24 from the substrate 16 via additive manufacturing or 3D printing.

The method 12 also includes curing 84 the composition to form the structural film 24 disposed on the substrate 16 in the pattern 26, 126, 226, 326, 426, as set forth above. Curing 84 may include, for example, injection molding, baking, exposing the composition to ultraviolet radiation, heating, drying, air cooling, and combinations thereof, and may form the pattern 26, 126, 226, 326, 426 arranged to disrupt and dissipate the sound wave 14.

The method 12 may further include minimizing 86 an interfacial energy between the substrate 16 and the structural film 24. As used herein, the terminology interfacial energy refers to a ratio of a potential energy of atoms and molecules at the contact interface 34 (FIG. 1) to an area of the contact interface 34. That is, for embodiments including a polymer substrate 16 and a metal composition, the method 12 may include reducing the interfacial energy to thereby level out or diminish the first amplitude 20 (FIG. 1) of the sound wave 14.

For some embodiments, the method 12 may further include, after depositing 82, subtracting 88 a portion 90 of the structural film 24. That is, the pattern 26, 126 may be formed by removing the portion 90 by, for example, etching, laser-base cutting, printing, water jetting, grit blasting, and the like, to form the pattern 26, 126 arranged as the honeycomb 50 and/or plurality of ribbons 48 as set forth above.

Referring again to FIG. 8, the method 12 also includes quantifying 92 a roughness profile of the pattern 26, 126, 226, 326, 426. That is, quantifying 92 may include analyzing or evaluating one or each of the arithmetic mean roughness, Ra, ten-point mean roughness, Rz, reduce peak height, Rpk, reduced valley depth, Rvk, and core roughness, Rk, of the structural film 24 to ascertain whether the roughness profile is acceptable or unacceptable for an application. If the roughness profile is unacceptable, the method 12 may include again depositing 82 the composition and curing 84 the composition to form the structural film 24. For example, again depositing 82 may include changing one or more dimensions, i.e., the height 60, base width 62, top width 58, diameter 72, and length 64, of the pattern 26, 126, 226, 326, 426 until the pattern 26, 126, 226, 326, 426 is acceptable. Similarly, for embodiments including the composition formed from a fabric, metal, polymer, or composite, again depositing 82 may include altering a stacking or layer sequence to form the pattern 26, 126, 226, 326, 426 until the pattern 26, 126, 226, 326, 426 is acceptable.

The method 12 also includes, for example, once the roughness profile is acceptable, measuring 94 the second frequency 30 (FIG. 1) and the second amplitude 32 (FIG. 1). That is, measuring 94 may include comparing the second frequency 30 to the first frequency 18 and the second amplitude 32 to the first amplitude 20 to ascertain whether the noise, vibration, and harshness-dampening characteristics of the structural film 24 are acceptable or unacceptable for an application. If the characteristics are unacceptable, the method 12 may include again depositing 82 the composition and curing 84 the composition to form the structural film 24. For example, again depositing 82 may include changing one or more dimensions, i.e., the height 60, base width 62, top width 58, diameter 72, and length 64, of the pattern 26, 126, 226, 326, 426 until the pattern 26, 126, 226, 326, 426 is acceptable. Similarly, for embodiments including a composition formed from a fabric, metal, polymer, or composite, again depositing 82 may include altering a stacking or layer sequence to form the pattern 26, 126, 226, 326, 426 until the noise, vibration, and harshness-dampening characteristics are acceptable.

As described with continued reference to FIG. 8, the method 12 also includes coating 96 the pattern 26, 126, 226, 326, 426 with the coating layer 25 to thereby form the composite article 10. Coating 96 may include thermally or kinetically spraying the coating layer 25 onto the structural film 24 and pattern 26, 126, 226, 326, 426. Suitable examples of high thermal and high kinetic spraying may include high velocity oxyfuel spraying and high velocity air fuel spraying. Suitable examples of low thermal and low kinetic depositing may include twin wire arc deposition and plasma deposition. Suitable examples of low thermal and high kinetic spraying include cord spraying. In addition, coating 96 may include bond coating an aluminum, selenium, zinc, or copper steel alloy onto the structural film 24. Such coating 96 may increase an adhesion of the coating layer 25 to the structural film 24.

Therefore, the composite article 10 and method 12 may be useful for applications requiring excellent efficiency, comparatively high stiffness, and minimal noise, vibration, and harshness during operation. In particular, the composite article 10 may dampen the sound wave 14 during operation so as to mitigate noise, vibration, and harshness, and may have excellent stiffness and mechanical properties. That is, the composite article 10 may efficiently and effectively dissipate sound energy, but may also be suitable for applications requiring excellent stiffness, strength, and toughness.

Further, the composite article 10 may be economical to manufacture, may be scalable to mass production manufacturing operations, and may improve an operating environment.

While the best modes for carrying out the disclosure have been described in detail, those familiar with the art to which this disclosure relates will recognize various alternative designs and embodiments for practicing the disclosure within the scope of the appended claims.

What is claimed is:

1. A composite article configured for mitigating noise, vibration, and harshness, the composite article comprising:
   a substrate having a first stiffness;
   a structural film formed from a composition and disposed on the substrate in a pattern that is arranged to dampen a sound wave having a first frequency and a first amplitude and propagatable in a first direction to a second frequency that is less than the first frequency and a second amplitude that is less than the first amplitude; and
   a coating layer disposed on the pattern and configured to dampen the sound wave in the first direction and in a second direction that is perpendicular to the first direction;
   wherein the composite article has a second stiffness that is greater than the first stiffness;
   wherein the substrate is a metal and the composition is a polymer.

2. The composite article of claim 1, wherein the structural film contacts the substrate at a contact interface, and further wherein the composition and the contact interface define a contact angle of from 0° to 90°.

3. The composite article of claim 1, wherein the substrate has a first surface and a second surface spaced opposite the first surface, and further wherein the structural film is solely disposed on the first surface.

4. The composite article of claim 1, wherein the structural film has:
   an arithmetical mean roughness, Ra, of from 4 microns to 15 microns;
   a ten-point mean roughness, Rz, of from 35 microns to 110 microns;
   a reduced peak height, Rpk, of from 2.5 microns to 15 microns;
   a core roughness, Rk, of from 13 microns to 45 microns; and
   a reduced valley depth, Rvk, of from 2.5 microns to 15 microns.

5. The composite article of claim 4, wherein the pattern is configured as a sponge such that the structural film defines a plurality of voids therein.

6. The composite article of claim 4, wherein the pattern is configured as a plurality of ribbons.

7. The composite article of claim 1, wherein the pattern is configured as a honeycomb including a plurality of diamonds and a plurality of hexagons each adjoining at least two of the plurality of diamonds and at least another one of the plurality of hexagons.

8. The composite article of claim 7, wherein each side of the plurality of hexagons protrudes from the substrate as a wedge having a top width of from 20 microns to 50 microns, a height of from 150 microns to 170 microns, and a base width of from 40 microns to 80 microns.

9. The composite article of claim 7, wherein each side of the plurality of diamonds has a height of from 50 microns to 70 microns and a width of from 20 microns to 30 microns.

10. The composite article of claim 7, wherein the pattern further includes a plurality of retainers each configured to stabilize the honeycomb such that one of the plurality of retainers is disposed within a respective cavity defined by each of the plurality of hexagons and protrudes from the substrate.

11. The composite article of claim 10, wherein each of the plurality of retainers has a width of from 100 microns to 120 microns and a height of from 20 microns to 30 microns.

12. The composite article of claim 7, wherein the pattern is configured as a wedge field and includes a plurality of adjoining wedges each having a top width of from 40 microns to 60 microns, a height of from 100 microns to 120 microns, a base width of from 80 microns to 120 microns, and a length of from 400 microns to 600 microns.

13. The composite article of claim 12, wherein four of the plurality of adjoining wedges form a rectangle defining a void therebetween.

14. The composite article of claim 7, wherein the pattern is configured as an embossed field and includes a plurality of cones extending from the substrate, wherein each of the plurality of cones has a circular base having a diameter of from 50 microns to 80 microns and a height of from 100 microns to 120 microns.

15. A method of forming a composite article configured for mitigating noise, vibration, and harshness, the method comprising:
   depositing a composition onto a substrate having a first stiffness;
   curing the composition to form a structural film disposed on the substrate in a pattern that is arranged to dampen a sound wave having a first frequency and a first amplitude and propagatable in a first direction to a second frequency that is less than the first frequency and a second amplitude that is less than the first amplitude;
   quantifying a roughness profile of the pattern;
   measuring the second frequency and the second amplitude; and
   coating the pattern with a coating layer configured to dampen the sound wave in the first direction and in a second direction that is perpendicular to the first direction to thereby form the composite article including:
   the substrate having the first stiffness;
   the structural film formed from the composition and disposed on the substrate in the pattern; and
   the coating layer disposed on the pattern;
   wherein the composite article has a second stiffness that is greater than the first stiffness;
   wherein the substrate is a metal and the composition is a polymer; and
   wherein the composite article has a second stiffness that is greater than the first stiffness.

16. The method of claim 15, further including, after depositing, subtracting a portion of the structural film.

17. The method of claim 15, further including minimizing an interfacial energy between the substrate and the structural film.

18. A composite article configured for mitigating noise, vibration, and harshness, the composite article comprising:
   a substrate having a first stiffness;
   a structural film formed from a composition and disposed on the substrate in a pattern that is arranged to dampen a sound wave having a first frequency and a first amplitude and propagatable in a first direction to a second frequency that is less than the first frequency and a second amplitude that is less than the first amplitude; and a coating layer disposed on the pattern and configured to dampen the sound wave in the first direction and in a second direction that is perpendicular to the first direction;

wherein the composite article has a second stiffness that is greater than the first stiffness;

wherein the substrate is a polymer and the composition is a metal; and wherein the coating layer includes a metallic composite particulate deposited within a plurality of woven layers without breaking the plurality of woven layers.

19. The composite article of claim 18, wherein the structural film contacts the substrate at a contact interface, and further wherein the composition and the contact interface define a contact angle of from 0° to 90°.

20. The composite article of claim 18, wherein the substrate has a first surface and a second surface spaced opposite the first surface, and further wherein the structural film is solely disposed on the first surface.

* * * * *